(12) United States Patent
Rathgeb

(10) Patent No.: US 7,086,200 B2
(45) Date of Patent: Aug. 8, 2006

(54) DOOR EDGE BUMPER STRIP

(76) Inventor: Peter M. Rathgeb, 960 Evergreen Dr., Delray Beach, FL (US) 33483

( * ) Notice: Subject to any disclaimer, the term of this patent is extended or adjusted under 35 U.S.C. 154(b) by 142 days.

(21) Appl. No.: 10/740,397

(22) Filed: Dec. 22, 2003

(65) Prior Publication Data
US 2005/0132654 A1 Jun. 23, 2005

(51) Int. Cl.
B60J 5/00 (2006.01)

(52) U.S. Cl. ............................................... 49/462
(58) Field of Classification Search ................ 49/460, 49/462; 52/716.1, 716.5, 717.01; 160/40
See application file for complete search history.

(56) References Cited

U.S. PATENT DOCUMENTS

| | | | |
|---|---|---|---|
| 3,380,193 A | 4/1968 | Hill | |
| 3,513,595 A * | 5/1970 | Mills | 49/462 |
| 3,667,163 A * | 6/1972 | Bjorum et al. | 49/462 |
| 4,277,526 A | 7/1981 | Jackson et al. | |
| 4,372,083 A * | 2/1983 | Hatzikelis et al. | 49/462 |
| 4,570,383 A | 2/1986 | Adell | |
| 4,587,762 A | 5/1986 | Adell | |
| RE32,819 E * | 1/1989 | Waugh | 428/31 |
| 4,839,991 A | 6/1989 | Rathgeb | |
| 4,998,380 A | 3/1991 | Adell | |
| 5,062,665 A | 11/1991 | Schotthoefer | |
| 5,083,399 A | 1/1992 | Schotthoefer | |
| 6,810,635 B1 * | 11/2004 | Meizlish | 52/716.5 |
| 2002/0108314 A1 | 8/2002 | Mantegazza | |

FOREIGN PATENT DOCUMENTS

| | | |
|---|---|---|
| DE | 1 954 088 LS | 5/1971 |
| DE | 20 06 004 A1 | 8/1971 |
| DE | 26 16 744 A1 | 11/1977 |
| DE | 87 10 703 U1 | 12/1987 |
| GB | 2197372 A * | 5/1988 |

* cited by examiner

Primary Examiner—Jerry Redman
(74) Attorney, Agent, or Firm—Joseph Scafetta, Jr.

(57) ABSTRACT

A bumper strip, adapted for insertion inside a cut-out portion made in a door of a motor vehicle, has an outer plastic skin and an inner resilient pad. Preferably, the outer plastic skin has a triangular cross section and the inner resilient pad has a rectangular cross section. Also preferably, the outer plastic skin is flexible and the inner resilient pad is made of rubber. Furthermore, the outer plastic skin has a triangular tip at its narrow end. Moreover, the outer plastic skin is flushly mounted and color matched to the door. When the door is opened and it strikes an adjacent object, such as a parked car or a garage wall, instead of causing damage thereto, the outer plastic skin flexes and the inner resilient pad compresses like a sponge so that the bumper strip absorbs the shock of the impact without damaging the adjacent object.

9 Claims, 2 Drawing Sheets

DOOR EDGE BUMPER STRIP

BACKGROUND OF THE INVENTION

1. Field of the Invention

The invention related to a flushly mounted bumper strip fitted into a cut-out portion of a vertical exterior door edge of a motor vehicle.

2. Discussion of the Prior Art

It has been a problem in the prior art to prevent damage in the nature of scrapes and so-called "dings" to closely parked cars when a driver and passengers exit their motor vehicles by opening the doors. Often an edge of a door of the vehicle being exited sustains a scratch when the door hits a wall in a parking garage.

One apparatus for solving this problem was disclosed by this inventor in his earlier U.S. Pat. No. 4,839,991 which was issued on Jun. 20, 1989, for a "Retractable Guard for Motor Vehicle Doors". Disadvantages of this initial attempt to solve the problem were that the apparatus was a large, bulky, ugly protruding rubber device which had complicated moving parts and was expensive to manufacture.

Other earlier and later inventors have also tackled the same problem with little or no commercial success. Many of the patented inventions are either aesthetically unpleasing or do not conform to the contours of the vehicle so that more drag is produced, thus lowering fuel efficiency. Examples of these types of inventions and other inventions patented and located during a preliminary patentability search are discussed briefly below.

U.S. Pat. No. 4,570,383 was issued to Adell on Feb. 18, 1986, and provides a teaching of forming a recess-depressed region inwardly from a car door surface to accept a door edge guard having a thickness corresponding to the recess depth. See in particular the embodiments of FIGS. 6 and 7 and the language of col. 4 beginning at line 14 to line 36. Adell also describes using colored plastics so that the color of the outer guard matches the color of the vehicle door in order to promote the appearance of flushness between the guard and the car door. See also Adell's later U.S. Pat. No. 4,587,762 which was issued on May 13, 1986 and his much later U.S. Pat. No. 4,998,380 which was issued on Mar. 12, 1991.

Schotthoefer discloses in his U.S. Pat. No. 5,083,399, which was issued on Jan. 28, 1992, the use of matched-color, polyvinylflouride (PVF) material for door guards. In his earlier U.S. Pat. No. 5,062,665 which was issued on Nov. 5, 1991, Schotthoefer discloses the use of double-sided adhesive tape to affix a guard to a car door.

The earliest attempt to solve this problem in the prior art appears to have been made by Fischer in his German Patent Application No. 1 954 088 which was published on May 6, 1971. Fischer provided motor car door protection where the edge meets a bottom corner of the door which opens outwardly. The edge and/or the bottom corner were covered by an elastic material, i.e. rubber or plastic. Thus, these two sections of the door were produced from rubber or plastic instead of metal. Unfortunately, no drawings were provided by the sole inventor who filed his own application.

Another sole inventor working on this problem in the prior art is Mantegazza who filed an application which was printed as Publication No. US 2002/0108314 A1 on Aug. 15, 2002. The invention was entitled "Impact-Protection Profile for Automobiles". The profile was made of plastoferrite so that it could be applied directly at an edge of a metal sheet forming the outer car body without the interposition of additional materials, such as glues, adhesive tapes and the like. The application was abandoned on Sep. 22, 2003.

Despite the advances made by these prior art devices in solving the problem, none of them, including the recessed mounts of Adell, allow for flexure or shock absorption by the devices themselves. Therefore, they do not protect against dings to doors being impacted. They are merely guards which address the problem from the standpoint of the offending car and the edge of its swinging door. Although they claim to protect other objects, this inventor cannot see how they do, in particular the flushly mounted guards of Adell.

Thus, it remains a problem in the prior art to prevent dings absolutely against the sides of impacted motor vehicles which are parked next to the offending car door.

SUMMARY OF THE INVENTION

A flushly mounted bumper strip is shaped to be fitted into a cut-out portion, also known as a designed-in recessed portion, of a vertical exterior door edge of a motor vehicle. The bumper strip may be affixed to the door by a peel-and-seal, double-sided, adhesive strip, thus making the bumper strip replaceable by a user if the bumper strip is so damaged that it no longer serves its useful purpose. Such damage may occur in a collision.

The bumper strip has an outer flexible plastic skin colored to match the color of the vehicle door to which the bumper strip is attached. The bumper strip is backed by a resilient, sponge-like, rubber pad with an inner surface that is fitted into and adhesively affixed inside the cut-out interior position of the vertical door edge.

In cross section, the outer skin of the bumper strip is narrowly and triangularly shaped with its narrow tip facing rearwardly so as to engage tightly with a conventional, elastomeric, door jamb-mounted, weather seal when the door is closed. The narrow tip of the triangular outer skin of the bumper strip has in cross section the shape of half of an arrow head split vertically. This unusual shape is helpful to the proper and complete sealing function of the narrow tip.

The resilient, sponge-like, rubber pad is rectangular in cross section and is affixed to the outer skin by double-sided adhesive tape along the longer side of the rectangular rubber pad. This rubber pad extends for about 70% of the length of the adjacent outer plastic skin.

In use and upon opening a car door equipped with the present invention, the narrow tip of the outer plastic skin first hits an adjacent object, such as a parked car or a garage wall. Upon impact, the flexible outer plastic skin and its resilient, back-up, rubber pad both deform slightly, thereby cushioning the blow and preventing damage first to the object encountered, as well as to the bumper strip itself.

After impact, the rubber pad resiliently returns to its normal shape and the plastic outer skin likewise reverts to its pre-impact shape. Thus, the entire bumper strip is restored to its original alignment with the car door to which it is attached.

Other advantages of the present invention are that the bumper strip is color-matched to the car door, is flushly mounted to the same door, is inexpensive to manufacture, has no moving parts and is easy to replace if severely damaged. Also, the seam between the bumper strip and the car door is nearly invisible.

This specific combination of a plastic outer skin affixed to an inner resilient pad is not shown in precisely identical form in the prior art and is believed by the inventor to be patentable thereover. Although the plastic outer skin is preferably flexible and triangularly shaped, the plastic outer skin could be inflexibly hard and rectangularly shaped, as long as the underlying rubber pad is resilient and easily deforms to absorb shocks whenever the outer skin impacts against an adjacent object.

Thus, the present invention is believed to solve the problem of preventing dings to cars being impacted by an offensive opening car door on which the bumper strip of the present invention is affixed.

DETAILED DESCRIPTION OF THE PREFERRED EMBODIMENTS

Figure 1:
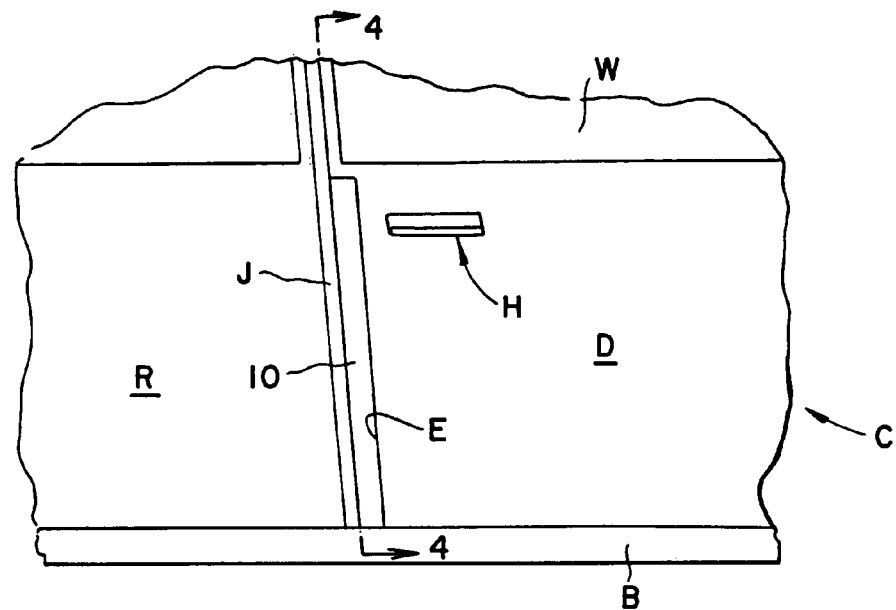
FIG. 1 is a side elevational view of the bumper strip of the present invention attached to an edge of a front passenger door.

In FIG. 1, there is illustrated several parts of a motor vehicle, such as a car C having a front door D which is opened on a passenger's side by lifting a handle H. The door D has a window W and is closed above a running board B. The car C is also shown with a jamb J and a rear passenger door R having its own window and running board.

A bumper strip 10 of the present invention is flushly mounted and secured to an edge E of the door D. This bumper strip 10 is preferably 1.5 inches wide and 2 feet long. Of course, the width and length of the bumper strip 10 may be formed in greater or lesser widths and lengths, depending upon the width and length of the door D to which the bumper strip 10 is attached.

The color of the attached bumper strip 10 should be carefully matched to the color of the door D. This matching will be done either when the car C is made in a manufacturing plant or when the original bumper strip 10 is replaced at an auto body shop after the bumper strip 10 has been damaged.

Figure 2:
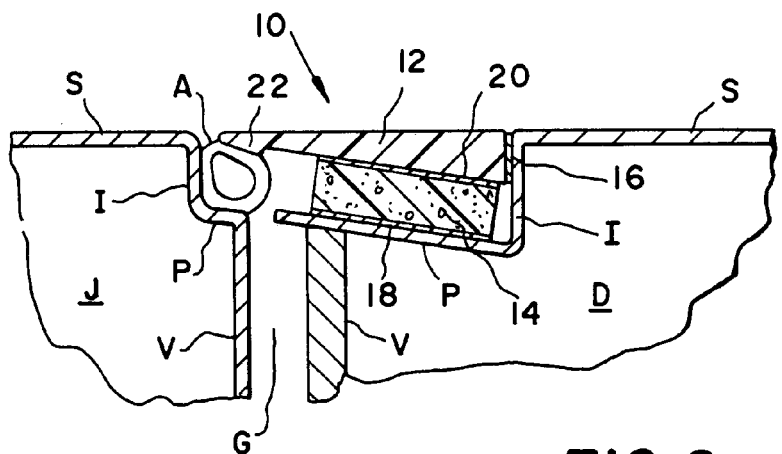
FIG. 2 is a top cross-sectional view of the bumper strip affixed to an edge of a driver's side door.

In FIG. 2, there is shown a top cross-sectional view of the door D closed on the driver's side, as well as the jamb J. Both the door D and the jamb J have outer surfaces S made of either metal or fiberglass. Both the door D and the jamb J also have inwardly extending sections I, parallel recessed portions P and parallel vertical sections V separated by a gap G.

The bumper strip 10 of the present invention is seen in FIG. 2 to be fitted into a cut-out portion of the surface S. This cut-out portion has the parallel recessed portions P forming its back and the inwardly extending sections I forming its sides between the door D and the jamb J.

The bumper strip 10 has two major components. The first component is an outer plastic skin 12. The plastic may be hard and inflexible. Preferably, the plastic is soft and flexible.

The second component of the bumper strip 10 is an inner resilient pad 14. Preferably, the pad is sponge-like rubber. However, other resilient materials, such as soft and pliable plastic may be used. Nevertheless, in all cases, the inner pad 14 must be resilient. This characteristic of the inner pad 14 is essential, particularly if the outer plastic skin 12 is hard and inflexible, because the bumper strip 10 must be able to deform somewhere if it is going to absorb any impacts without causing damage.

The bumper strip 10 is secured inside the cut-out portion along two areas. The first area is a wide end of the outer plastic skin 12 which is attached to part of the inwardly extending section I of the door D by a first double-sided adhesive strip 16. This strip 16 also serves to prevent wind and rain from entering a space between the inwardly extending section I and the pad 14.

The second area for attachment of the bumper strip 10 inside the cut-out portion is located between an entire long side of the inner resilient pad 14 and the parallel recessed portion P of the door D. In this second area, there is a second double-sided adhesive strip 18.

The outer plastic skin 12 is affixed along its long inner side to another entire long side of the inner resilient pad 14 by a third double-sided adhesive strip 20.

Although the double-sided adhesive strips 16, 18 and 20 are preferred, plastic glues may be used in lieu thereof. Such glues may be either hard and inflexible or soft and pliable. A key characteristic is that the glues must be able to adhere plastic and rubber to metal or to each other in extremely hot or cold temperatures over all periods of time without cracking and breaking up. Such a characteristic is found in adhesives used in the double-sided strips 16, 18 and 20, but it is not found in all glues. Also, these strips 16, 18 and 20 are preferred because they are easily and completely applied while glues are usually messy and incompletely applied between adjacent surfaces which are made of diverse materials.

In FIG. 2, the outer plastic skin 12 is seen to be triangular in cross section and the inner resilient pad 14 is seen to be rectangular in cross section. These shapes are preferred. However, the outer plastic skin 12 may be rectangular and the inner resilient pad 14 may be triangular as long as the pad 14 is thick enough at a narrow apex of its triangular cross section to deform sufficiently but incompletely to absorb the shock of any impact against an offended adjacent object.

Still referring to FIG. 2, the triangularly shaped, outer plastic skin 12 is shown to have a triangular tip 22 at its narrow end. This tip 22 has a shape in the form of half of an arrow head split vertically. This unusual shape closes and cushions the tip 22 against a deformable, hollow, rubber weather strip A which seals the gap G between the door D and the jamb J to prevent wind and rain from entering the car C.

Figure 3:
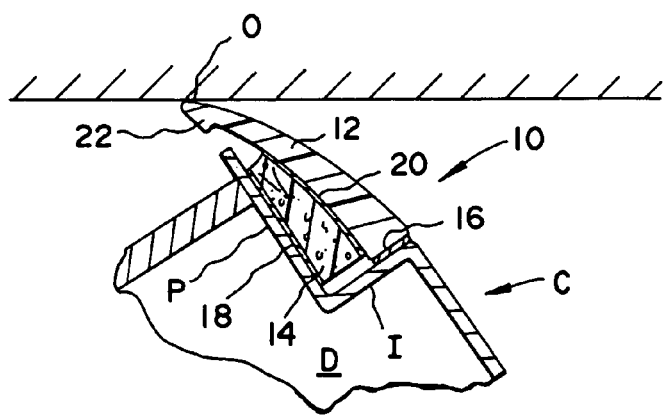
FIG. 3 is a top cross-sectional view of the bumper strip impacting upon an adjacent object, such as a parked car door or a parking garage wall, and deforming as a result of the impact.

Referring now to FIG. 3, the bumper strip 10 is illustrated in operation. When the door D is opened by the driver, it may strike an object O, such as an adjacent parked car or a parking garage wall. In all cases, a conscientious driver does not want to damage the property of another, if only for the sake of avoiding increased auto insurance premiums. However, accidents sometimes happen due to carelessness or inattentiveness on the part of the driver or a passenger.

Nevertheless, in the event of an impact by the offending door D against the offended object O, a car C equipped with the bumper strip 10 will not cause any damage to the object O at the point of impact because the outer plastic skin 12 will bend at its tip 22 and the inner resilient pad 14 will compress like a sponge, thus absorbing any shock caused by the impact.

The bumper strip 10 remains in place inside the cut-out portion because the wide end of the triangularly shaped outer plastic skin 12 is kept securely fixed to the inwardly extending section I by the first double-sided adhesive strip 16. The long side of the rectangularly shaped, inner resilient pad 14 is likewise kept securely fixed to the parallel recessed portion P by the second double-sided adhesive strip 18. Similarly, the outer plastic skin 12 remains securely fixed to the inner resilient pad 14 by the third double-sided adhesive strip 20.

Figure 4:
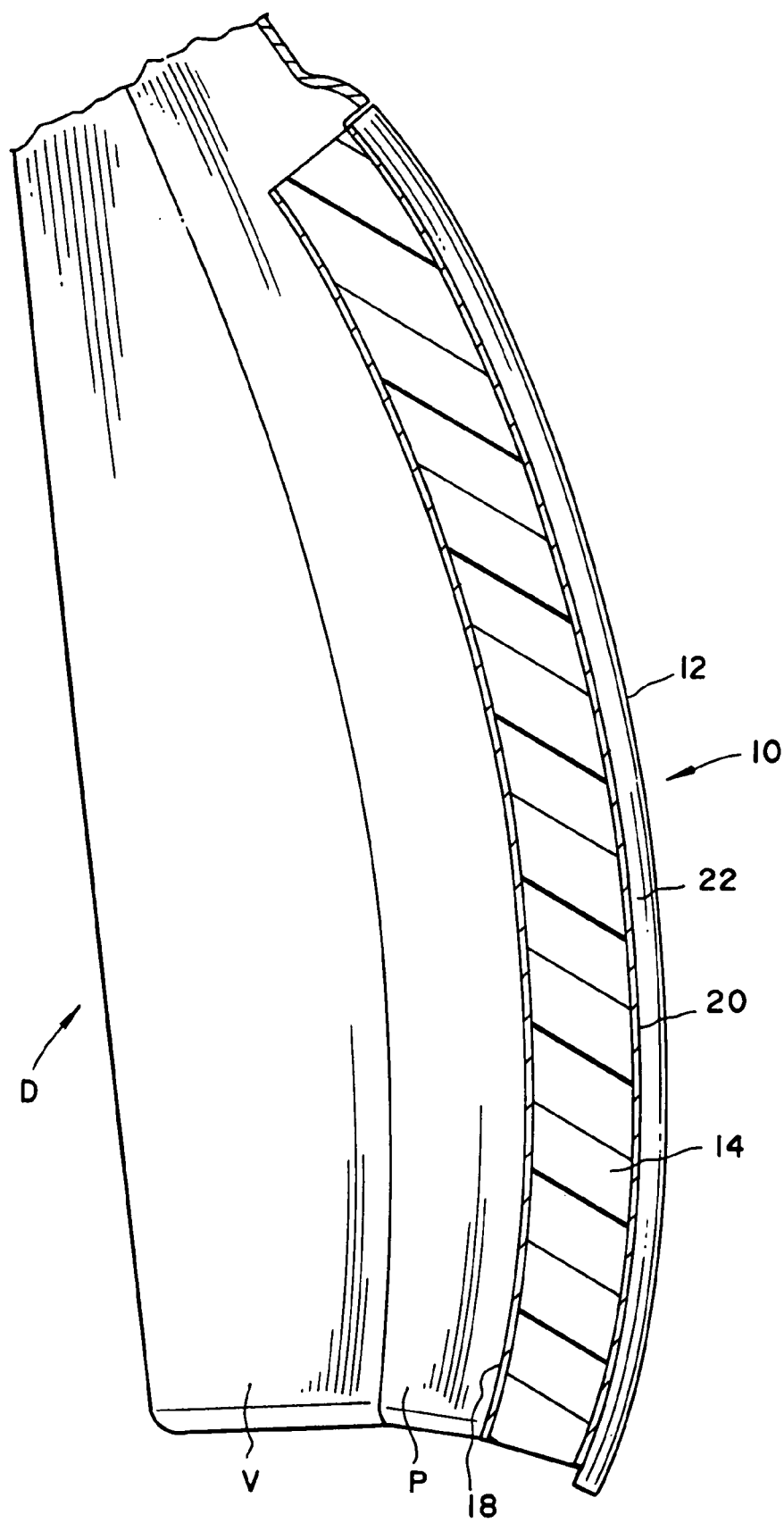
FIG. 4 is a vertical end view of the bumper strip taken along line 4—4 of FIG. 1.

FIG. 4 is an end view taken along line 4—4 of FIG. 1 which shows the door D on the passenger's side. Viewing FIG. 4 from right to left, there are shown the narrow tip 22 and the outer plastic skin 12, the third double-sided adhesive strip 20 which adheres the outer plastic skin 12 to the inner resilient pad 14, the second double-sided adhesive strip 18 which adheres the inner resilient pad 14 to the parallel recessed portion P, and the parallel vertical section V.

The present invention has been shown in its two preferred embodiments. As mentioned in the foregoing description, other embodiments are also possible. Further embodiments will occur to other persons skilled in this particular technology. Thus, it should be apparent to those persons that the invention is not limited to the preferred embodiments. Consequently, the disclosed embodiments may be changed or modified without departing from the spirit and scope of the invention, as it is defined in the appended claims.

I claim:

1. A bumper strip comprising:
   a. an outer plastic skin;
   b. an inner resilient pad adhered to the outer plastic skin;
   c. a first double-sided adhesive strip adhering the outer plastic skin to a cut-out portion made in a door of a motor vehicle; and
   d. a second double-sided adhesive strip adhering the inner resilient pad to the cut-out portion made in the door of the motor vehicle;
      wherein the outer plastic skin is color matched to the door of the motor vehicle.

2. A bumper strip according to claim 1, further comprising:
   e. a third double-sided adhesive strip adhering the outer plastic skin to the inner resilient pad.

3. A bumper strip according to claim 1, wherein:
   said outer plastic skin has a triangular cross section.

4. A bumper strip according to claim 3, wherein:
   said inner resilient pad has a rectangular cross section.

5. A bumper strip according to claim 3, wherein:
   said outer plastic skin has a triangular tip at its narrowed end.

6. A bumper strip according to claim 5, wherein:
   said triangular tip has a shape in a form of half of an arrow head split vertically.

7. A bumper strip according to claim 1, wherein:
   said outer plastic skin is flushly mounted to the door.

8. A bumper strip according to claim 1, wherein:
   said outer plastic skin is flexible.

9. A bumper strip according to claim 1, wherein:
   said inner resilient pad is made of rubber.

* * * * *